(12) United States Patent
Johnson

(10) Patent No.: US 12,239,099 B2
(45) Date of Patent: Mar. 4, 2025

(54) PET NAIL GRINDER

(71) Applicant: WAHL CLIPPER CORPORATION, Sterling, IL (US)

(72) Inventor: Bruce V. Johnson, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 666 days.

(21) Appl. No.: 17/446,674

(22) Filed: Sep. 1, 2021

(65) Prior Publication Data

US 2022/0071171 A1 Mar. 10, 2022

Related U.S. Application Data

(60) Provisional application No. 63/076,655, filed on Sep. 10, 2020.

(51) Int. Cl.
*A01K 13/00* (2006.01)
*A45D 29/05* (2006.01)

(52) U.S. Cl.
CPC .............. *A01K 13/00* (2013.01); *A45D 29/05* (2013.01)

(58) Field of Classification Search
CPC ........ A45D 29/05; A45D 29/14; A61B 17/54; A01K 13/00; B23D 67/06; B23D 67/10; B23D 67/12; B23D 71/005
USPC ..... 132/73.5, 75.6, 75.8; 451/344, 358, 359, 451/523, 524
See application file for complete search history.

(56) References Cited

U.S. PATENT DOCUMENTS

| | | | | |
|---|---|---|---|---|
| 4,440,182 A | * | 4/1984 | Holm | A45D 29/14 132/75.6 |
| 4,896,684 A | * | 1/1990 | Chou | A45D 29/05 451/344 |
| 5,123,430 A | * | 6/1992 | Davidovitz | A45D 29/02 132/75.5 |
| 7,621,011 B2 | | 11/2009 | Smith et al. | |
| 10,541,588 B2 | | 1/2020 | Wachter et al. | |
| D904,698 S | | 12/2020 | Moeller et al. | |
| D910,937 S | * | 2/2021 | Wei | D30/158 |
| 2007/0186867 A1 | * | 8/2007 | Mulloy | A01K 13/00 119/609 |
| 2008/0214097 A1 | * | 9/2008 | Kao | B25F 3/00 451/344 |
| 2009/0145259 A1 | * | 6/2009 | Wall | B24B 23/022 279/52 |

(Continued)

FOREIGN PATENT DOCUMENTS

| | | | | |
|---|---|---|---|---|
| CN | 104191337 A | * | 12/2014 | ............. B24B 23/00 |
| CN | 210226530 U | | 4/2020 | |
| FR | 1520812 A | | 4/1968 | |

OTHER PUBLICATIONS

International Search Report and Written Opinion received for PCT/US21/48803, mailed Feb. 7, 2022.

*Primary Examiner* — Jacqueline T Johanas
*Assistant Examiner* — Holly T. To
(74) *Attorney, Agent, or Firm* — Greer, Burns & Crain, Ltd

(57) ABSTRACT

A pet nail grinder is provided, including, a grinder housing having a first, working end, and a second, opposite end; a drive system located within the grinder housing; a grinding bit connected to the drive system and projecting from the first end; and a control button connected to the drive system and projecting from the second end so that the drive system (Continued)

is operable by facing the second end towards a surface and impacting the control button against the surface.

16 Claims, 8 Drawing Sheets

(56) References Cited

U.S. PATENT DOCUMENTS

| | | | |
|---|---|---|---|
| 2010/0000557 A1* | 1/2010 | Keene | A45D 29/14 362/253 |
| 2014/0259691 A1* | 9/2014 | Arndt | B26B 19/06 30/277.4 |
| 2020/0260689 A1* | 8/2020 | Jacobowitz | A01K 13/00 |

* cited by examiner

PET NAIL GRINDER

RELATED APPLICATION

The present application claims the benefit under 35 US 119 (e) of U.S. Provisional Application Ser. No. 63/076,655 filed Sep. 10, 2020, the entire contents of which are incorporated by reference herein.

BACKGROUND

The present invention relates generally to hand-held, electrically-powered pet grooming appliances, and more specifically to pet nail grinders used for grooming pet nails or claws.

Pet care is a growing industry. Pet owners, particularly owners of dogs and cats often hire professional groomers on a periodic basis. Others groom their pets at home. When it comes to pet nail care, nails need to be trimmed regularly. However, the use of conventional nail trimmers leaves the nails with sharp edges. Also, for those pet owners who participate in pet shows, the improper trimming of nails can cause the animal to adopt an undesirable sitting or standing posture that detracts from the pet's performance.

Accordingly, pet groomers are increasingly using pet nail grinders for rounding nail edges produced by conventional nail trimmers. Conventional electrically-powered grinders have a rotating, generally cylindrical abrasive bit that grinds the nail tissue. Since many pets resist this operation, the groomer often needs one hand to hold the animal, and the other holds the grinder. As such, it becomes awkward to activate the ON/OFF or control button or other controls on conventional grinders. Further, conventional powered grinders have a button for temporarily locking the chuck that holds the bit in place, so that the bit can be replaced. In some cases, this button is positioned so that it extends radially from an exterior of the housing. During operation, users often accidentally activate the chuck lock while grinding, thus potentially loosening the bit and interfering with the grinding process.

Another drawback of conventional pet grinders is that, especially when conducted at pet shows, the grinding operation is often performed in poor lighting conditions. The groomer thus often has difficulty observing the work area, which is made worse when the pet is actively resisting the grinding operation. While lighted appliances are known, such as powered drills, conventional pet grinders have been deficient in this area.

Still another drawback of conventional pet grinders is that extended operation often needed for completing the grooming of all of a pet's nails causes the grinder to heat up, and become uncomfortable for the user to hold. This problem is especially troubling for groomers using the same grinder sequentially on multiple animals.

Yet another problem of conventional electrically-powered pet nail grinders is that the generally cylindrical shape of the grinder housing causes the unit to roll off of a substrate, such as a grooming stand or table, while the user wrestles the pet into position for grinding. The loss of access to the grinder when needed makes the grooming process more difficult, and often results in damage to the grinder from impact with the floor.

Accordingly, there is a need for an improved, electrically-powered pet nail grinder that addresses the problems discussed above.

SUMMARY

The above-listed need is met or exceeded by the present pet nail grinder including several features that facilitate operation by pet groomers. A push-type ON/OFF or control button is located at a rear end of the grinder housing, opposite from a grinding bit at a working end. In a preferred embodiment, the button is coaxial with an axis defined by a motor spindle. This placement allows the user to grasp the unit in a typical overhand-type manner used for grinding, and to turn the unit off or on by tapping the rear of the housing so that the control button impacts against a substrate, such as a grooming table without requiring a change in the grip of the unit or participation by the user's other hand.

Near the working end, the present pet nail grinder features a spindle cap made of light transmissive material, and including a plurality of LED lights for illuminating the work area. In the preferred embodiment, four LED's are provided in an arrangement that surrounds the grinding bit for providing enhanced illumination. Included on an inner surface of the spindle cap are integrally formed brackets for securing the LED's in place, and the brackets are preferably also made of light transmissive material. The present grinder is configured so that when the unit is turned on, the LED's are illuminated.

Yet another feature of the present grinder is an internal cooling fan mounted to the motor drive spindle between the motor and the grinding bit. The fan is constructed and arranged to draw air into vents located at the rear of the grinder housing to cool the motor. A group of exhaust vents in the spindle cap are part of an air flow path that draws heat from the motor and also directs the exhaust to the work area, clearing away pet hair and nail debris.

In addition, the present grinder features a heat sink mount that retains the motor within the housing in a secure but suspended manner without requiring complicated internal housing bosses and support walls which tend to block internal air flow. The heat sink is preferably configured in a honey-comb shape, with multiple axial air flow channels for promoting air circulation around the motor while holding the motor in position. Further, the heat sink is constructed of a resilient material that absorbs motor vibration, and reduces operational noise, as well as absorbing impact shock experienced by the grinder housing during use. Thus, the present grinder is kept cooler to the user's touch after extended operation compared to conventional units.

A spindle lock control button is preferably located in a flush orientation with an exterior of the grinder housing. This arrangement reduces the chances of the user accidentally pressing the button and locking the spindle during the grinding operation, which has been found in conventional grinders to impede operation. The grinder housing is preferably non-circular in transverse cross-section, impeding the tendency to roll off a substrate. Also, a rear peripheral flange is preferably provided with a plurality of spaced, raised projections that further prevent unwanted rolling of the grinder on a substrate, such as a grooming table.

In the present pet nail grinder, the grinding bit is mounted to the motor spindle extending from the motor armature, to which the cooling fan is also mounted, providing a direct drive system. A motor speed control is preferably provided in the form of a rotating collar mounted to the grinder housing. An optional hanging hook is also provided.

More specifically, a pet nail grinder is provided, including, a grinder housing having a first, working end, and a second, opposite end; a drive system located within the grinder housing; a grinding bit connected to the drive system and projecting from the first end; and a control button connected to the drive system and projecting from the second end so that the drive system is operable by facing the second end towards a surface and impacting the control button against the surface.

In an embodiment, the control button linearly reciprocates relative to the second end. In an embodiment, the drive system defines a linear axis of the grinder, and the control button is centered along the linear axis.

In one embodiment, a spindle cap is provided on the grinder housing, located closer to the working end than to the second end, the spindle cap being made of light transmissive material, and defining mounting points for at least one light, the at least one light constructed and arranged for illuminating the grinding bit. In an embodiment, four lights are peripherally spaced around the spindle cap, each light being secured in a bracket integrally formed with the spindle cap.

In an embodiment, the housing includes at least one intake vent closer to the second end than to the working end, and the drive system includes a motor with a drive spindle accommodating the grinding bit, the grinder including a cooling fan mounted to the drive spindle between the motor and the grinding bit. In an embodiment, a spindle cap is provided on the grinder housing, located closer to the working end than to the second end, the spindle cap having at least one exhaust vent in fluid communication with the cooling fan and the at least one intake vent. In an embodiment, at least one intake vent includes a first plurality of vents near the control button; and a second plurality of vents adjacent a peripheral edge of the spindle cap in proximity to the grinder housing.

In another embodiment, the drive system includes a motor enclosed within the grinder housing, and the grinder further includes a heat sink disposed in the housing for securing the motor, the heat sink defining a tube with an opening dimensioned for accommodating the motor, and a plurality of support ribs radially extending from said tube, the support ribs being dimensioned for contacting inner surfaces of the grinder housing for securing the motor within the housing. In an embodiment, the heat sink is constructed of resilient material for absorbing vibrations generated by the motor, and the plurality of support ribs are disposed in spaced relationship to each other to define air flow channels therebetween.

In an embodiment, the drive system includes a motor with a drive spindle accommodating the grinding bit, the pet nail grinder including a spindle lock with a biased locking pin reciprocating transversely to an axis defined by the spindle, the locking pin having an actuator button with an upper surface positioned to extend no farther than an exterior surface of the grinder housing.

In an embodiment, the spindle further includes a toothed spindle lug rotating with the spindle, and the spindle lock locking pin being in selective engagement with the spindle lug for periodically locking the spindle from rotation upon depression of the actuator button.

In another embodiment, a pet nail grinder is provided, including a grinder housing having a first, working end, and a second, opposite end, a drive system located within the grinder housing; a grinding bit connected to the drive system and projecting from the first end; and a spindle cap on the grinder housing, located closer to the working end than to the second end, the spindle cap being made of light transmissive material, and defining mounting points for at least one light, the at least one light constructed and arranged for illuminating the grinding bit.

In still another embodiment, pet nail grinder is provided, including a grinder housing having a first, working end, and a second, opposite end, a drive system located within the grinder housing, a grinding bit connected to the drive system and projecting from the first end, and the drive system includes a motor with a drive spindle accommodating the grinding bit, the grinder including a cooling fan mounted to the drive spindle between the motor and the grinding bit.

DETAILED DESCRIPTION

Figure 1:
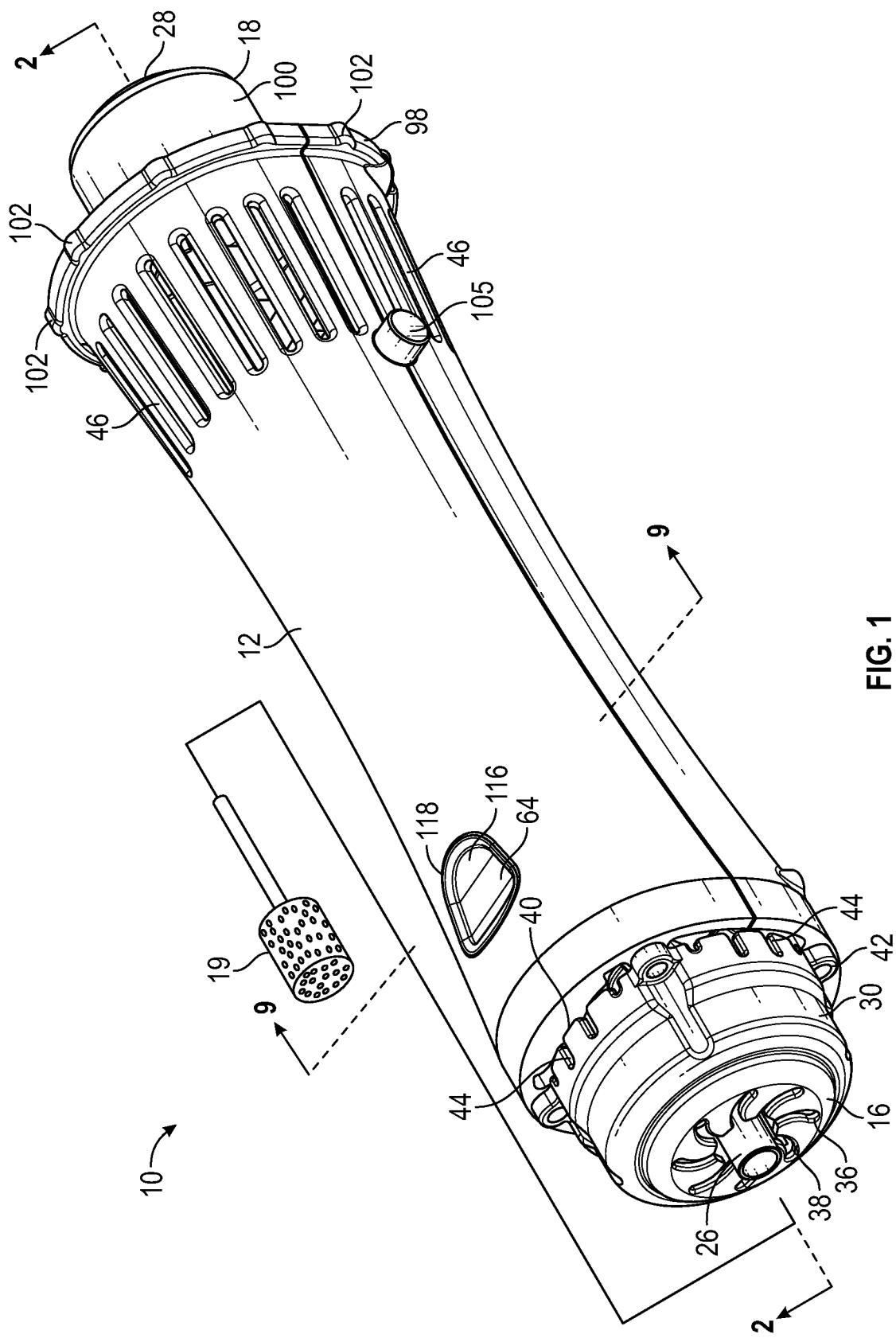
FIG. 1 is a top perspective view of the present nail grinder.
Figure 2:
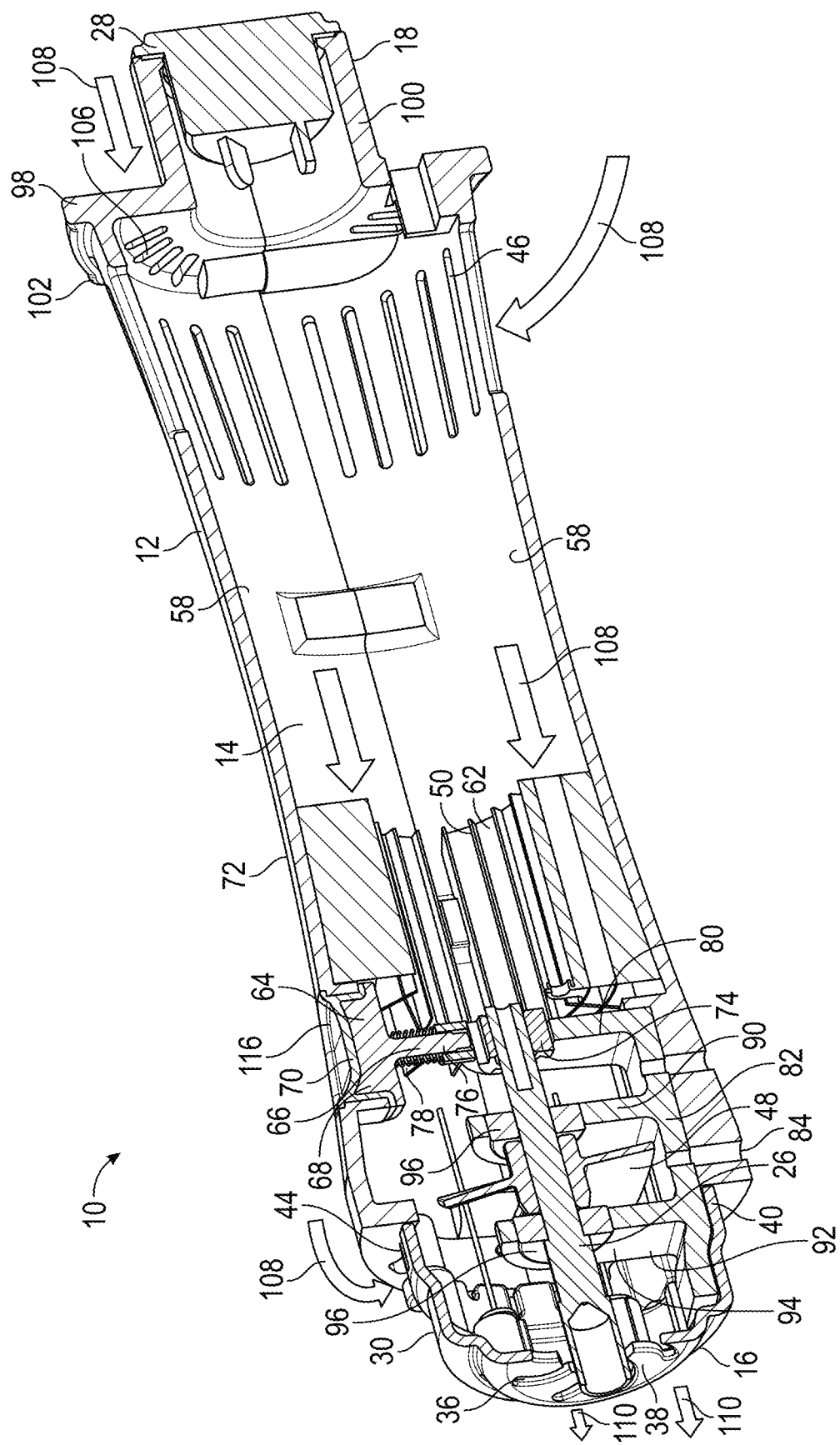
FIG. 2 is a cross-section taken along the line 2-2 of FIG. 1 and in the direction generally indicated.
Figure 3:
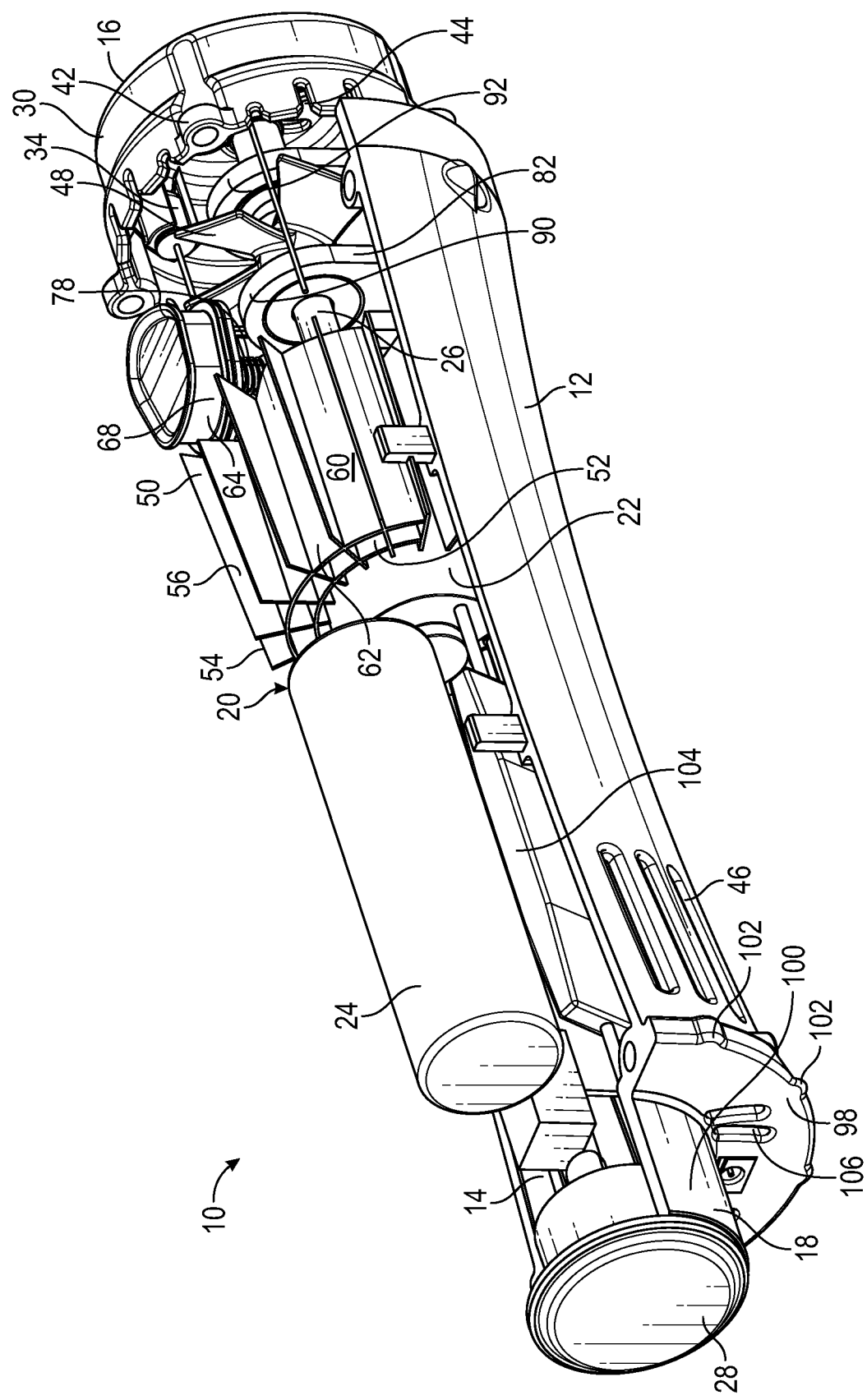
FIG. 3 is a fragmentary rear perspective view of the present nail grinder with portions omitted for clarity.

Referring now to FIGS. 1-3, the present pet nail grinder is generally designated 10 and includes a grinder housing 12, preferably made from a pair of molded, clamshell-like portions as is well known in the small appliance art. Defined by the grinder housing 12 is an interior space 14, a first, working end 16, and an opposite, second end 18. Accommodated at the working end 16 is a grinding bit 19 as is well known in the art, with a preferably cylindrical or can-shaped abrasive portion, and a mounting shaft. As is known in the art, the grinder 10 is provided with a user-lockable retaining chuck (not shown) for holding the bit mounting shaft in place.

A grinder drive system 20 located within the grinder housing 12 includes a motor 22, preferably powered by a battery 24 and having a drive shaft or drive spindle 26 that defines a longitudinal axis of the grinder 10. The battery 24 is preferably rechargeable, but disposable batteries are contemplated, as well as a line cord connection, as is well known in the art.

A feature of the present grinder 10 is an ON/OFF or control button 28 projecting from the second end 18 and linearly or axially reciprocating relative to the second end between an On and an Off position under a biasing force. While other orientations are contemplated, the control button 28 preferably reciprocates in a centered position along the pet nail grinder longitudinal axis. Thus, a user grasping the grinder 10 turns the grinder off and on by impacting the button 28 against a surface, such as a grooming table.

Figure 8:
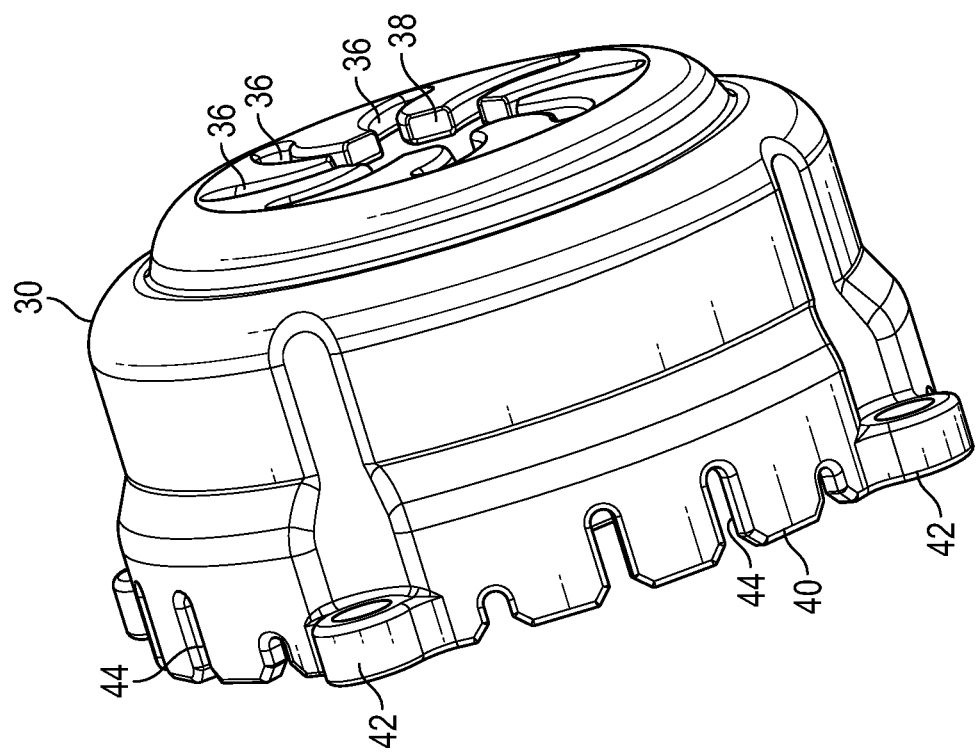
FIG. 8 is a side perspective view of the spindle cap of FIG. 7.
Figure 7:
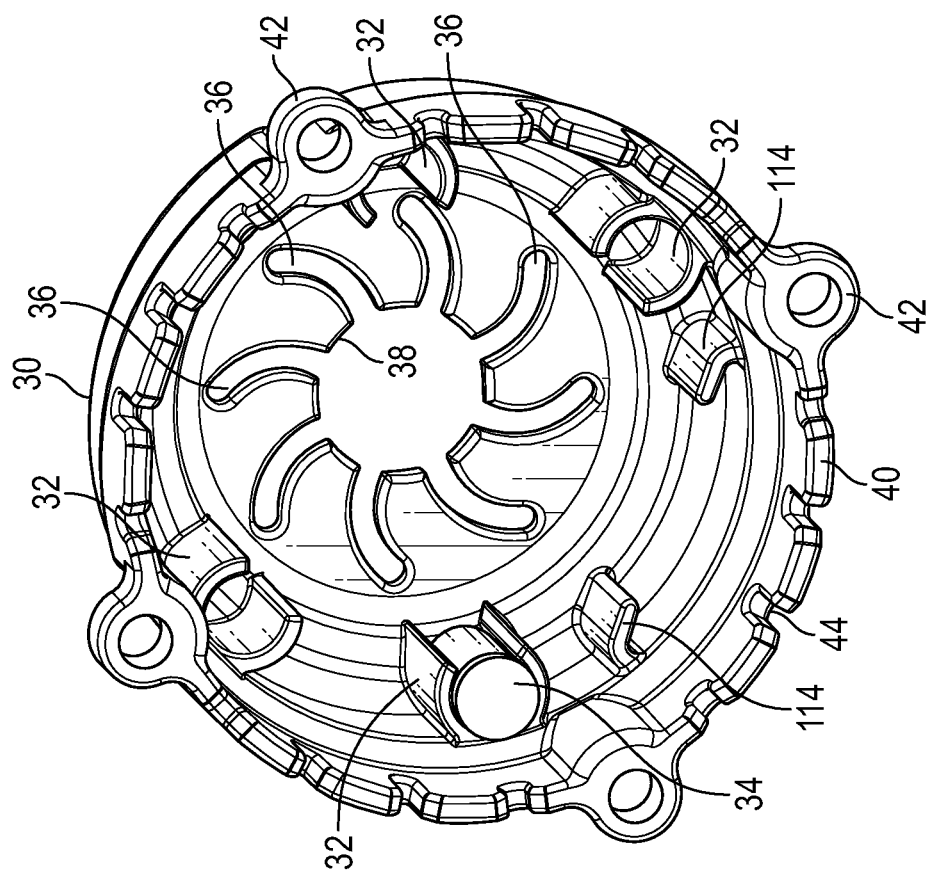
FIG. 7 is a rear perspective view of the spindle cap of the present nail grinder.

Referring now to FIGS. 1, 7 and 8, attached to the grinder housing 12 closer to the working end 16 than to the second end 18, and preferably at the working end 16, is a spindle cap 30 made of light transmissive material, which is contemplated as being transparent or translucent, depending on the material selected. In its preferred form, the spindle cap 30 defines peripherally spaced mounting points 32 for at least one light 34 (FIG. 7), the lights preferably being four LEDs, however other bulbs or similar illuminating elements are contemplated. The mounting points 32 are preferably integrally formed, generally "C"-shaped and retain the light 34 using friction force. Once the lights 34 are mounted in the mounting points 32 and are illuminated, the light transmissive material of the spindle cap 30 will cause enhanced illumination of the grinding bit 19. Also included on the spindle cap 30 is at least one and preferably a plurality of exhaust vents 36, preferably in fluid communication with a central opening 38 as well as with the interior housing space 14 as will be described in greater detail below.

A rear end 40 of the spindle cap 30 is provided with eyelets 42 for accommodating fasteners (not shown) for securing the cap to the grinder housing 12. Also at the spindle cap rear end 40 is at least one and preferably a plurality of slot-like air vents 44. Turning now to the second housing end 18, the grinder housing 12 includes at least one, slot-like intake vent 46. In the preferred embodiment, a plurality of intake vents 46 are provided, being located preferably closer to the second end than to the working end 16 and being disposed about a periphery of the grinder housing 12. While other orientations are contemplated, the intake vents 46 are elongate, and extend parallel to the grinder longitudinal axis.

Referring to FIGS. 2-5, the above discussion of the vents 36, 44 and 46 relate to several features of the present pet nail grinder 10. First, to promote internal air flow and reduce operational heat, the grinder 10 includes a cooling fan 48 mounted to the drive spindle 26 between motor 22 and the grinding bit 19. As such the cooling fan 48 rotates while the motor 22 is in operation, pulling in air from the air intake vents 46 to pass over and cool the motor within the interior housing space 14. The cooling fan 48 also pulls in air from the spindle cap air vents 44, and combines that air with the air drawn from the vents 46 to create an exhaust air flow that is in fluid communication with, and passes through the exhaust vents 36 in the spindle cap 30. The spindle cap exhaust vents 36 are narrowly dimensioned to increase the velocity of the exhaust air, which is directed at the grinding bit work area, and thus blows away loose hair and debris from the user's work area.

Referring now to FIGS. 2-5, the grinder 10 further includes a heat sink 50 disposed in the housing 12, specifically in the interior housing space 14, for securing the motor 22 in position within the housing. The heat sink 50 is constructed and arranged for dissipating heat generated by the motor and for promoting cooling air flow within the interior housing space. A tube 52 is defined by the heat sink 50, having an opening 54 dimensioned for slidably accommodating the motor 22 in a friction fit. In addition, the heat sink 50 includes a plurality of support ribs 56 radially extending from the tube, the support ribs being dimensioned for contacting inner surfaces 58 of the grinder housing for securing the motor 22 within the housing 12 without requiring other internal support walls or baffles which might impede internal air flow.

For extra support, at least one supplemental ring 60 is connected to the support ribs 56, and has a larger diameter than the tube 52. In other words, the ring 60 circumscribes and is radially spaced from the tube 52. The arrangement of the ring 60, the tube 52 and the support ribs 56 creates a plurality of honey-comb-like air flow channels 62 for enhancing the cooling of the motor 22 during operation. In addition to supporting the motor 22, the heat sink 50 is preferably constructed of resilient, rubber-like, shock-absorbing material for absorbing vibrations generated by the motor 22 and for protecting the motor from impact damage if the grinder 10 is accidentally dropped. Another advantage of making the heat sink 50 out of resilient material is that the operational noise of the present grinder 10 is reduced.

Figure 5:
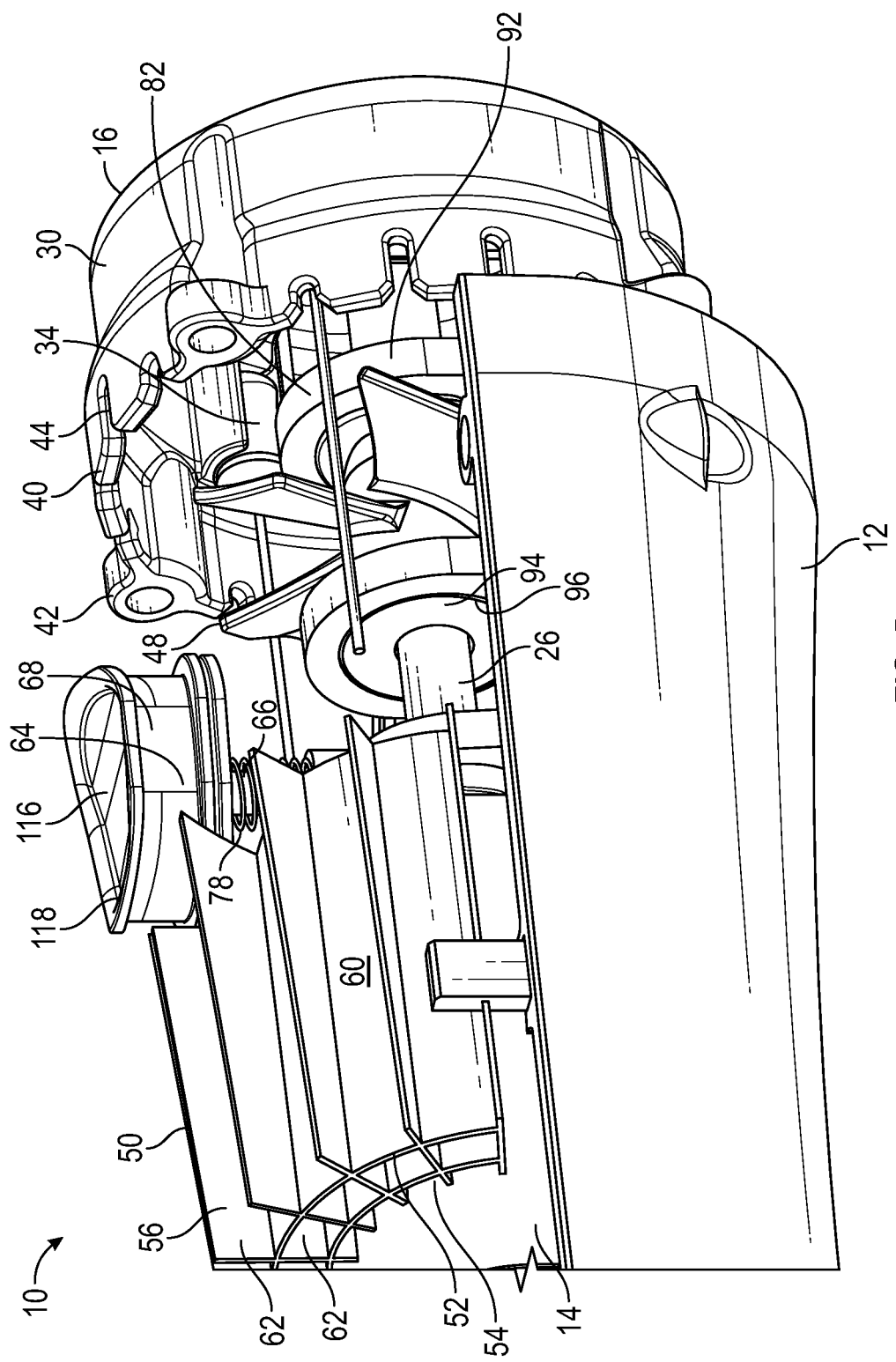
FIG. 5 is a fragmentary side perspective view of the present grinder with portions omitted for clarity.
Figure 6:
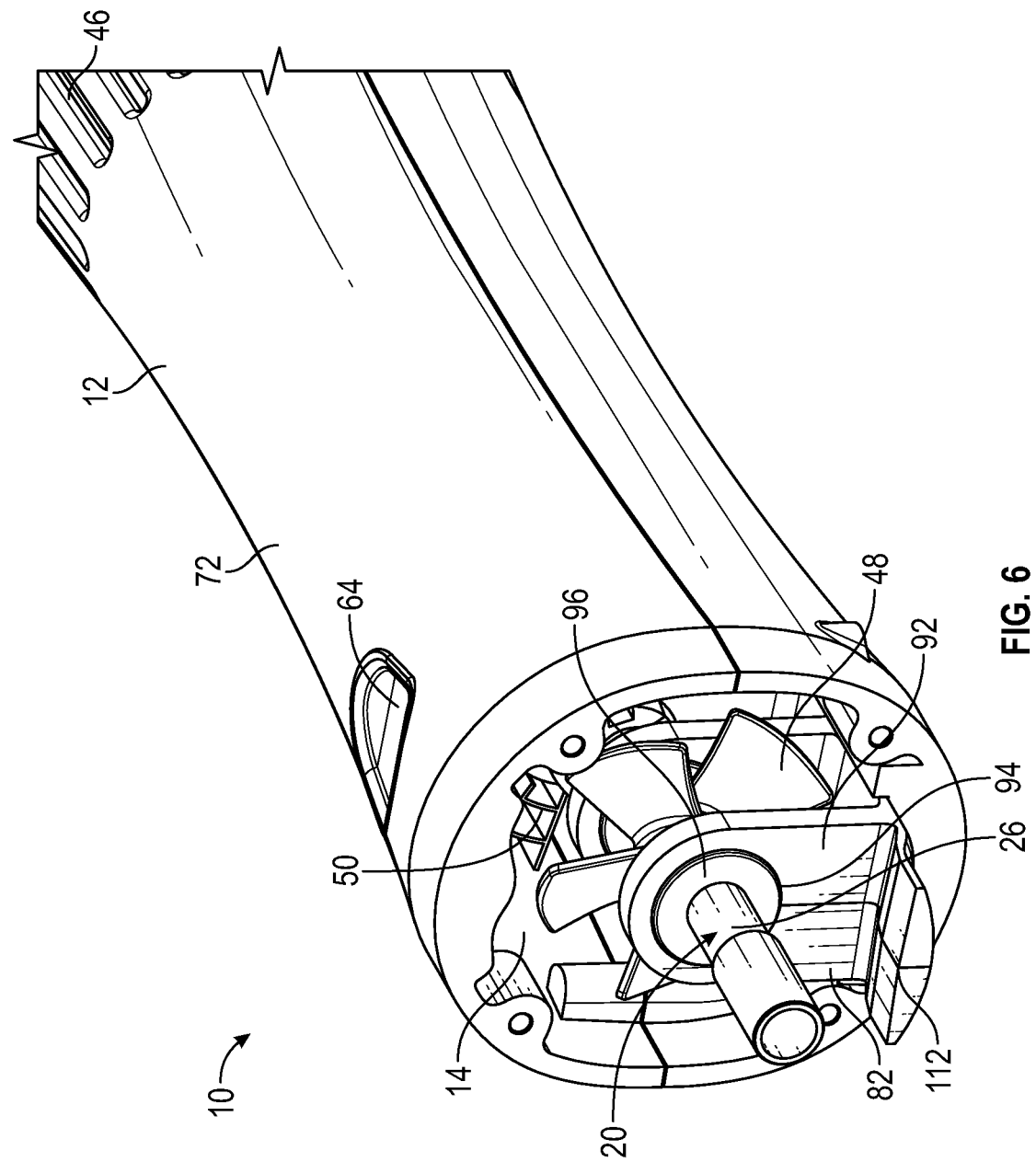
FIG. 6 is a fragmentary front perspective view of the nail grinder of FIG. 1 with portions omitted for clarity.
Figure 9:
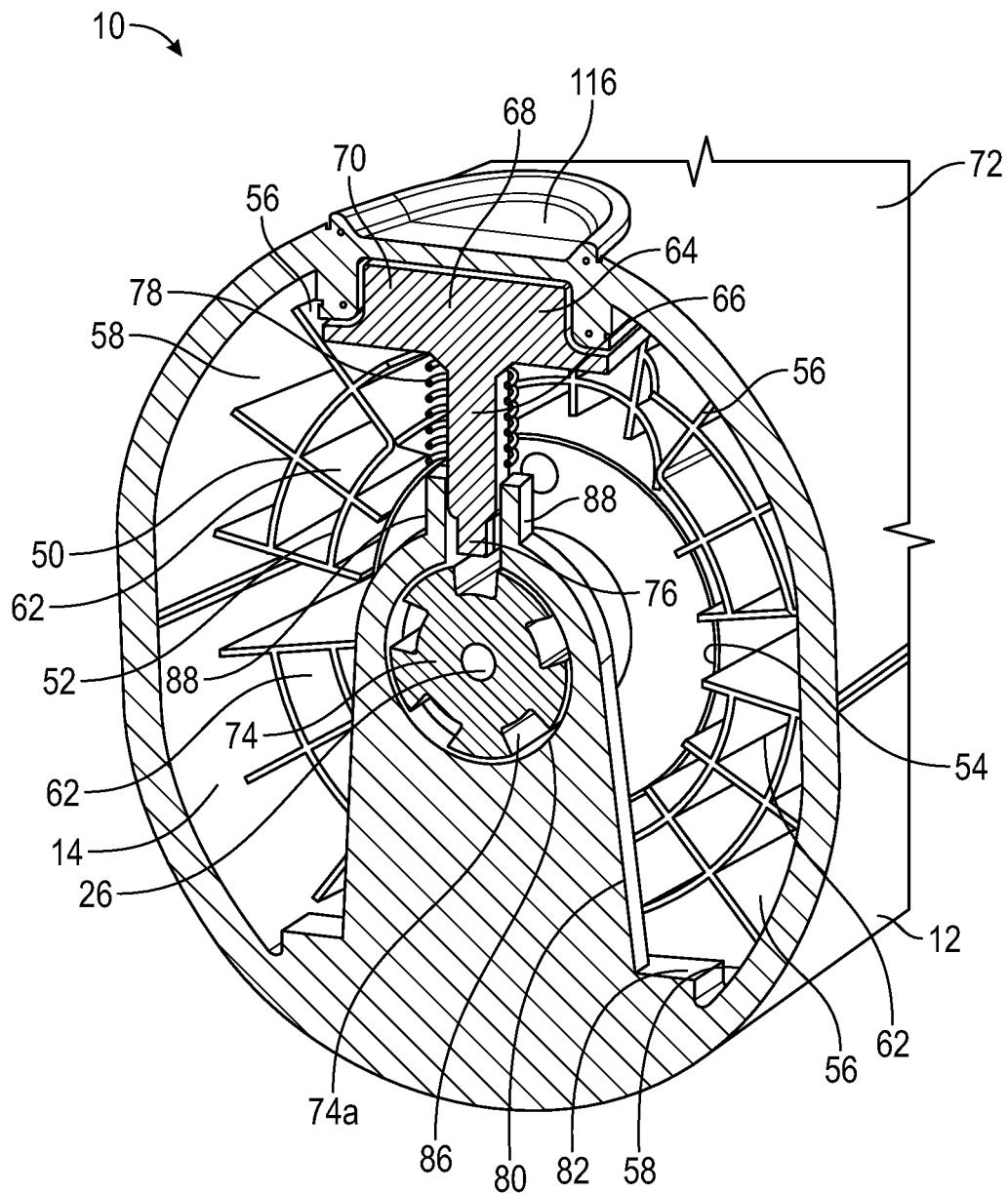
FIG. 9 is a section taken along the line 9-9 of FIG. 1 and in the direction generally indicated.

Referring now to FIGS. 2, 5 and 9, another feature of the present pet nail grinder 10 is a spindle lock 64 with a biased locking pin 66 reciprocating transversely to an axis defined by the spindle 26. Connected to the locking pin 66 is an actuator button 68 with an upper surface 70 positioned to extend no farther than an exterior surface 72 of the grinder housing 12. Also included in the spindle lock 64 is a toothed spindle lug 74 secured to, and rotating with the motor spindle 26. A tip 76 of the locking pin 66 selectively engages recesses 74a in the spindle lug 74 for periodically locking the spindle 26 from rotation upon user depression of the actuator button 68. A return biasing device 78, preferably a coiled spring or the like, biases the locking pin 66 to a disengaged position (FIG. 9), allowing the spindle lug 74 to rotate with the spindle 26.

Supporting the spindle lug 74 is a leg 80 of a three-legged bracket 82 secured within the interior housing space 14, preferably using fastener-receiving mounting bores 84. The leg 80, closest to the motor 22, includes a lug bore 86 dimensioned for rotatably accommodating the spindle lug 74. In addition, the leg 80 includes a hollow boss 88 in communication with the lug bore 86 for supporting and guiding the tip 76 of the locking pin 66. Two additional, axially spaced legs 90 and 92 of the bracket 82 include bores 94 receiving bushings 96 which support and rotatably accommodate the spindle 26. In the preferred embodiment, the cooling fan 48 is located on the spindle 26 between the legs 90 and 92, which is farther from the motor 22 than the spindle lock 64.

Referring now to FIGS. 2, 3, 6 and 9, another feature of the present pet nail grinder 10 is that the grinder housing 12 is constructed and arranged to inhibit rolling of the grinder on a substrate, such as a grooming table, so that the grinder will remain close to the user as the pet is placed in a grooming position. It will be seen that the housing 12 has a transverse cross-section (FIGS. 6 and 9) that is non-circular, being preferably ovoid or parabolic. In addition, adjacent the second end 18, a radially extending flange 98 that defines a socket 100 for the reciprocating control button 28 creates a rear endcap for the housing 12, and preferably is provided with a plurality of peripherally spaced, radially extending projections 102 that further inhibit rolling of the grinder 10 on a substrate. It is contemplated that the number, arrangement and configuration of the projections 102 is variable to suit the application.

Figure 4:
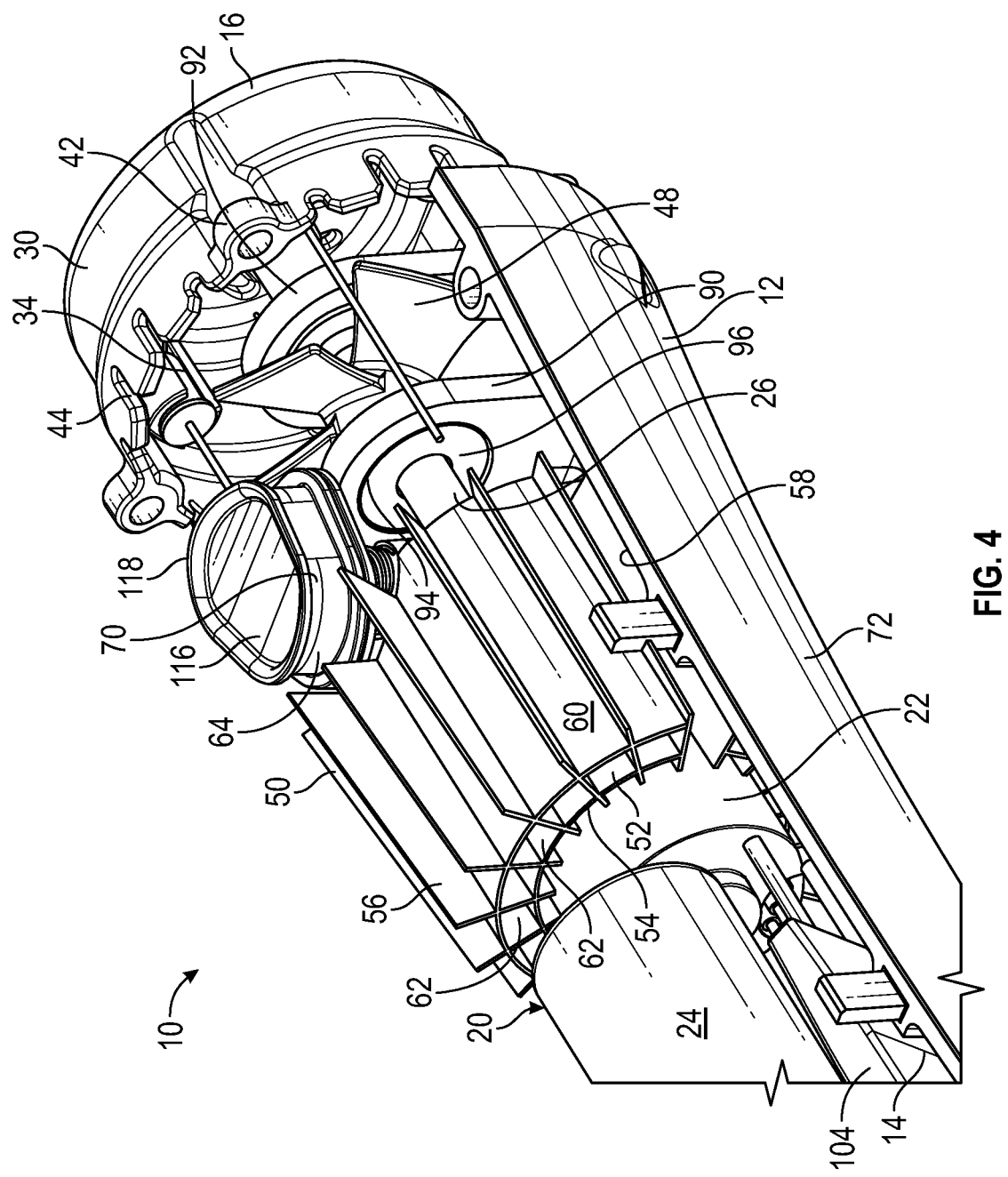
FIG. 4 is an enlarged fragmentary rear perspective view of the nail grinder of FIG. 3 with portions omitted for clarity.

Referring now to FIGS. 3-5, the drive system 20 of the present pet nail grinder 10 is shown in greater detail. The reciprocating control button 28 is electrically connected to a circuit board 104 located within the interior housing space 14. As is known in the art, the motor 22 and the battery 24 are also electrically connected to the circuit board 104, so that actuating the control button 28 causes the motor to operate, rotating the spindle 26 to which the grinder bit 19 is attached, which initiates rotation of the cooling fan 48 as well. A rotatable motor speed control 105 is seen in FIG. 1 extending from the grinder housing 12 and is also electrically connected to the motor 22 and to the circuit board 104. In the preferred embodiment, the circuit board 104 is constructed so that the lights 34, powered by the battery 24, will illuminate once the motor 22 is turned on.

Referring again to FIG. 2, the radial flange 98 is also preferably provided with endcap intake vents 106 which further enhance the intake air flow. As is the case with the rear intake vents 46, the endcap intake vents 106 are narrow, elongate and slit-like to prevent the intake of foreign material such as dirt, animal hair, nail clippings and the like which might impair grinder operation. Despite their thin profile, a sufficient number of the vents 46, 106 are provided for effective motor cooling, as well as exhaust flow for clearing the work area of grinding debris. In FIG. 2, arrows 108 indicate intake air flow, and arrows 110 indicate exhaust air flow.

Referring again to FIGS. 6 and 7, a forwardly-projecting tongue 112 of the three-legged bracket 82 is received in a space in the spindle cap 30 defined by angled mounting formations 114. Also, the spindle lock actuator button 68 is preferably provided with a resilient cover 116 including a border ring 118 configured for facilitating the user locating the lock by feel during the grinding operation.

While a particular embodiment of the present pet nail grinder has been described herein, it will be appreciated by those skilled in the art that changes and modifications may be made thereto without departing from the invention in its broader aspects and as set forth in the following claims.

What is claimed is:

1. A pet nail grinder, comprising:
    a grinder housing having a first, working end, and a second, opposite end;
    a drive system located within said grinder housing;
    a grinding bit connected to said drive system and projecting from said first end;
    a control button connected to said drive system and projecting from said second end so that said drive system is operable by facing said second end towards a surface and impacting said control button against said surface;
    a separate spindle cap on said grinder housing, located closer to said working end than to said second end, said spindle cap being made of light transmissive material, and defining mounting points for at least one light, said at least one light constructed and arranged for illuminating said grinding bit;
    said housing includes at least one intake vent adjacent said second end, and a second plurality of vents associated with said spindle cap and adjacent said at least one light;
    said drive system includes a motor enclosed within said grinder housing, and said grinder further includes a heat sink disposed in said housing for securing said motor, said heat sink defining a tube with an opening dimensioned for accommodating said motor, and a plurality of support ribs radially extending from said tube, said support ribs being dimensioned for contacting inner surfaces of said grinder housing for securing said motor within said housing; and
    said heat sink includes a supplemental ring having a larger diameter than said tube and connected to said support ribs for creating a plurality of honey-comb-like air channels.

2. The pet nail grinder of claim 1, wherein said control button linearly reciprocates relative to said second end.

3. The pet nail grinder of claim 1, wherein said drive system defines a longitudinal axis of said grinder, and said control button is centered along said longitudinal axis.

4. The pet nail grinder of claim 1, further including four of said at least one lights being peripherally spaced around said spindle cap, each said light being secured in a bracket integrally formed with said spindle cap.

5. The pet nail grinder of claim 1, wherein said drive system includes a motor with a drive spindle accommodating said grinding bit, said grinder including a cooling fan mounted to said drive spindle between said motor and said grinding bit.

6. The pet nail grinder of claim 5, wherein said at least one intake vent includes a first plurality of vents closer to said second end than to said working end, and.

7. The pet nail grinder of claim 5, further including said spindle cap having said at least one exhaust vent in fluid communication with said cooling fan and said at least one intake vent.

8. The pet nail grinder of claim 1, wherein said heat sink is constructed of resilient material for absorbing vibrations generated by said motor, and said plurality of support ribs are disposed in a spaced relationship to each other to define air flow channels therebetween.

9. The pet nail grinder of claim 1, wherein said motor has a drive spindle accommodating said grinding bit, said grinder including a spindle lock with a biased locking pin reciprocating transversely to an axis defined by said spindle, said locking pin having an actuator button with an upper surface positioned to extend no farther than an exterior surface of said grinder housing.

10. The pet nail grinder of claim 9, wherein said spindle further includes a toothed spindle lug rotating with said spindle, and said spindle lock locking pin being in selective engagement with said spindle lug for periodically locking said spindle from rotation upon depression of said actuator button.

11. The pet nail grinder of claim 1, wherein said grinder housing is constructed and arranged to inhibit rolling of the grinder on a substrate, including at least one of a non-circular transverse cross-section and a plurality of peripherally spaced, radially extending projections secured near said second end.

12. A pet nail grinder, comprising:
    a grinder housing having a first, working end, and a second, opposite end;
    a drive system located within said grinder housing;
    a grinding bit connected to said drive system and projecting from said first end; and
    a separate spindle cap on said grinder housing, located closer to said working end than to said second end, said spindle cap being made of light transmissive material, and defining mounting points for at least one light, said at least one light constructed and arranged for illuminating said grinding bit;
    said drive system includes a motor enclosed within said grinder housing, and said grinder further includes a heat sink disposed in said housing for securing said motor, said heat sink defining a tube with an opening dimensioned for accommodating said motor, and a plurality of support ribs radially extending from said tube, said support ribs being dimensioned for contacting inner surfaces of said grinder housing for securing said motor within said housing; and
    said heat sink includes a supplemental ring having a larger diameter than said tube and connected to said support ribs for creating a plurality of honey-comb-like air channels.

13. The pet nail grinder of claim 12, further including four of said at least one lights being peripherally spaced around said spindle cap, each said light being secured in a bracket integrally formed with said spindle cap.

14. A pet nail grinder, comprising:
    a grinder housing having a first, working end, and a second, opposite end;
    a drive system located within said grinder housing;

a grinding bit connected to said drive system and projecting from said first end; and said drive system includes a motor with a drive spindle accommodating said grinding bit, said grinder including a cooling fan mounted to said drive spindle between said motor and said grinding bit;

said housing includes at least one intake vent at said second end, and a separate spindle cap on said grinder housing, said spindle cap located closer to said working end than to said second end, said spindle cap having at least one exhaust vent in fluid communication with said cooling fan and said at least one intake vent;

said drive system includes said motor enclosed within said grinder housing, and said grinder further includes a heat sink disposed in said housing for securing said motor, said heat sink defining a tube with an opening dimensioned for accommodating said motor, and a plurality of support ribs radially extending from said tube, said support ribs being dimensioned for contacting inner surfaces of said grinder housing for securing said motor within said housing; and said heat sink includes a supplemental ring having a larger diameter than said tube and connected to said support ribs for creating a plurality of honey-comb-like air channels.

15. The pet nail grinder of claim 14, wherein said at least one intake vent includes a first plurality of vents closer to said second end than to said working end, and a second plurality of vents adjacent a peripheral edge of said spindle cap in proximity to said working end.

16. The pet nail grinder of claim 14, wherein said heat sink is constructed of resilient material for absorbing vibrations generated by said motor, and said plurality of support ribs are disposed in a spaced relationship to each other to define air flow channels therebetween.

* * * * *